US008879647B2

(12) United States Patent
Ashikhmin et al.

(10) Patent No.: US 8,879,647 B2
(45) Date of Patent: Nov. 4, 2014

(54) METHODS OF ALLOCATING RESOURCES IN A SYSTEM AND SYSTEMS IMPLEMENTING THE SAME

(75) Inventors: Alexei Ashikhmin, Morristown, NJ (US); Philip A. Whiting, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 13/456,749

(22) Filed: Apr. 26, 2012

(65) Prior Publication Data

US 2013/0287068 A1    Oct. 31, 2013

(51) Int. Cl.
*H04L 27/28* (2006.01)

(52) U.S. Cl.
USPC .......................................................... 375/260

(58) Field of Classification Search
USPC .................................. 375/219, 227, 224, 260
See application file for complete search history.

(56) References Cited

U.S. PATENT DOCUMENTS

| 2006/0114977 | A1* | 6/2006 | Ginis et al. ..................... 375/222 |
| 2009/0034554 | A1* | 2/2009 | Evans et al. .................... 370/468 |
| 2009/0232074 | A1* | 9/2009 | Yang et al. ...................... 370/329 |
| 2009/0268833 | A1* | 10/2009 | Ariyavisitakul et al. ...... 375/262 |
| 2011/0126075 | A1* | 5/2011 | Gunnam ........................ 714/752 |

FOREIGN PATENT DOCUMENTS

EP    0 905 948    3/1999

OTHER PUBLICATIONS

Dardari, D. et al., "Bit-loading for Unequal Error Protection of Video Streams in OFDM Wireless Systems," 2004 IEEE International Conference on Communications, vol. 5, Jun. 20, 2004, pp. 3076-3080.
Grunheid, R. et al., "Adaptive Modulation for the HIPERLAN/2 Air Interface," Internet Citation, Sep. 2000.
Abdelhakim, M. et al., "Adaptive Puncturing for Coded OFDMA Systems," 2009 IEEE International Conference on Communications, Jun. 14, 2009, pp. 1-5.
International Search Report and Written Opinion dated Aug. 2, 2013.
Thomas M. Cover and Joy A. Thomas, Elements of Information Theory ($1^{st}$ Edition), 1991, p. 242.
Rong-Rong Chen, et al., "Approaching MIMO Capacity Using Bitwise Markov Chain Monte Carlo Detection", IEEE Transactions on Communications, vol. 58, No. 2, Feb. 2010, pp. 423-428.
ITU-T Recommendation G.993.2, "Series G:Transmission Systems and Media, Digital Systems and Networks" Digital sections and digital line system—Access networks, Very high speed digital subscriber line transceivers 2 (VDSL2), Feb. 2006, pp. 1-252.

* cited by examiner

*Primary Examiner* — Khai Tran
(74) *Attorney, Agent, or Firm* — Harness, Dickey & Pierce

(57) ABSTRACT

At least one example embodiment discloses a method of controlling a system. The method includes determining a constant number of bits for each of a plurality of tones, each constant number of bits being constant, obtaining a single parameter from a user of the system, the single parameter being a code rate and transmitting, to the user, data as information bits in the plurality of tones across a channel based on the single parameter, each of the plurality of tones including the constant number of bits.

19 Claims, 4 Drawing Sheets

METHODS OF ALLOCATING RESOURCES IN A SYSTEM AND SYSTEMS IMPLEMENTING THE SAME

BACKGROUND

In digital subscriber line (DSL) systems, available frequencies for transmission may be divided into frequency bands, which may be referred to as carriers or tones. The division may be done through discrete multi-tone (DMT) modulation.

In DSL systems, each tone is allocated a different number of bits. For example, for each tone i, a different number of bits $b_i$ is transmitted. The number of bits for each tone is stored in a Bit Allocation Table. For the tone i, $2^{b_i}$ quadrature amplitude modulation (QAM) modulation is used. Consequently, the number of bits in each tone dictates a size of a QAM constellation for the tone.

The amount of data that can be transmitted across a tone may vary depending upon the quality of the signal at a frequency range associated with the tone.

Moreover, the number of bits in each tone can be reallocated through bit swapping or Seamless Rate Adaptation (SRA). Bits are allocated to tones based on the measured signal to interference plus noise ratios (SINRs) of the tones, respectively. For example, a number of bits in a first tone may be decreased if the SINR of the first tone is below a SINR margin. To offset the decrease, a number of bits in a second tone may be increased if the SINR of the second tone is above the SINR margin. This requires that bit changing be continuously performed based on changing SINRs.

SUMMARY

Example embodiments are directed to methods of allocating resources in a system and/or systems implementing the same.

The inventors have discovered that the use of a noise margin may introduce some inefficiencies. The noise margin is a factor subtracted from the total SINR. This is done to protect a line from decreases in the SINR which result from additional lines turning on (among other factors). Thus, the SINR remains sufficiently high over the tones so that accurate (low error) demodulation and correct (low error) decoding will ensue. The noise margin holds resources in reserve against adverse fluctuations. Thus, a high noise margin may slow the throughput of the system while a low noise margin may increase the risk of errors and a particular line dropping.

In an example embodiment, a constant number of bits are allocated to each tone. The number of bits in each tone is based on at least one of maximum SINR for the tone or a maximum number of bits permitted by the system. Consequently, the number of bits in each tone is not based on a continuously monitored SINR for the tone.

Moreover, example embodiments disclose a single parameter feedback from a receiver to a transmitter.

At least one example embodiment discloses a method of controlling a system. The method includes determining a constant number of bits for each of a plurality of tones, each constant number of bits being constant, obtaining a single parameter from a user of the system, the single parameter being a code rate and transmitting, to the user, data as information bits in the plurality of tones across a channel based on the single parameter, each of the plurality of tones including the constant number of bits.

In one example embodiment, the determining a constant number of bits includes determining an associated maximum signal to interference plus noise ratio (SINR) for each tone before the transmitting, and determining the constant number of bits for each tone based on the associated maximum SINR, the constant number of bits for each tone being constant subsequent to the transmitting.

In one example embodiment, the transmitting includes determining a scheduled transmission for symbols across each tone, and determining an associated actual signal to interference plus noise ratio (SINR) for each tone based on the scheduled transmission.

In one example embodiment, the determining the constant number of bits for each tone based on the associated maximum SINR includes, determining a maximum number of bits permitted by the system, and selecting the maximum number of bits permitted by the system as the constant number of bits, if the constant number of bits based on the associated maximum SINR exceeds the maximum number of bits permitted by the system.

In one example embodiment, the constant number of bits is a maximum number of bits permitted by the system for the tone.

In one example embodiment, the method further includes encoding the data into the information bits based on the code rate.

In one example embodiment, the code rate is a ratio of the information bits over a number of bits in a codeword.

At least one example embodiment discloses a method of receiving data over a system. The method includes receiving, from a provider, data across a plurality of tones, determining a single parameter based on mutual information across the plurality of tones, transmitting, to the provider, the single parameter, and receiving further data at a rate based on the single parameter.

In one example embodiment, the method further includes decoding the further data based on the single parameter.

In one example embodiment, the determining a single parameter includes, determining mutual information across each of the plurality of tones, and determining a sum of the mutual information over the plurality of tones and a sum of a number of bits across the plurality of tones, the single parameter being based on the sum of the mutual information and the sum of the number of bits across all tones.

In one example embodiment, the number of bits in each tone is independent of an associated signal to interference plus noise ratios (SINRs) of the tone during the receiving further data.

In one example embodiment, a number of bits in each tone is the same.

In one example embodiment, a number of bits in each associated tone is a maximum number of bits permitted by the system for the associated tone.

In one example embodiment, the number of bits in each tone is constant.

At least another example embodiment discloses a provider in a system. The provider includes an adjustable rate encoder configured to receive data and a single parameter, the single parameter being a code rate, the adjustable rate encoder being further configured to encode the data into encoded bits based on the code rate, a modulator configured to modulate the encoded bits across a plurality of tones, the number of encoded bits in each tone being a constant number of bits, and a transmitter configured to transmit the plurality of tones across a channel.

In one example embodiment, the modulator is configured to modulate the encoded bits using a constellation for each tone, a size of the constellation for each tone being constant.

In one example embodiment, the constant number of bits in each associated tone is based on a maximum signal to interference plus noise ratio (SINR) for the associated tone.

In one example embodiment, the constant number of bits in each associated tone is a maximum number of bits permitted by the system for the associated tone.

At least another example embodiment discloses a method of controlling a digital subscriber line (DSL) system. The method includes obtaining data by a provider of the DSL system, and transmitting, to a user, data as information bits in a plurality of associated tones across a channel of the DSL system, each of the associated plurality of tones including a maximum number of bits permitted by the DSL system for the associated tone.

BRIEF DESCRIPTION OF THE DRAWINGS

Example embodiments will be more clearly understood from the following detailed description taken in conjunction with the accompanying drawings.

FIG. 1 illustrates a conventional DSL system;

FIG. 2 illustrates a DSL system according to an example embodiment;

FIG. 3 illustrates a method of controlling a system according to an example embodiment; and FIG. 4 illustrates a method of receiving data over a system according to an example embodiment.

DETAILED DESCRIPTION

Figure 1:
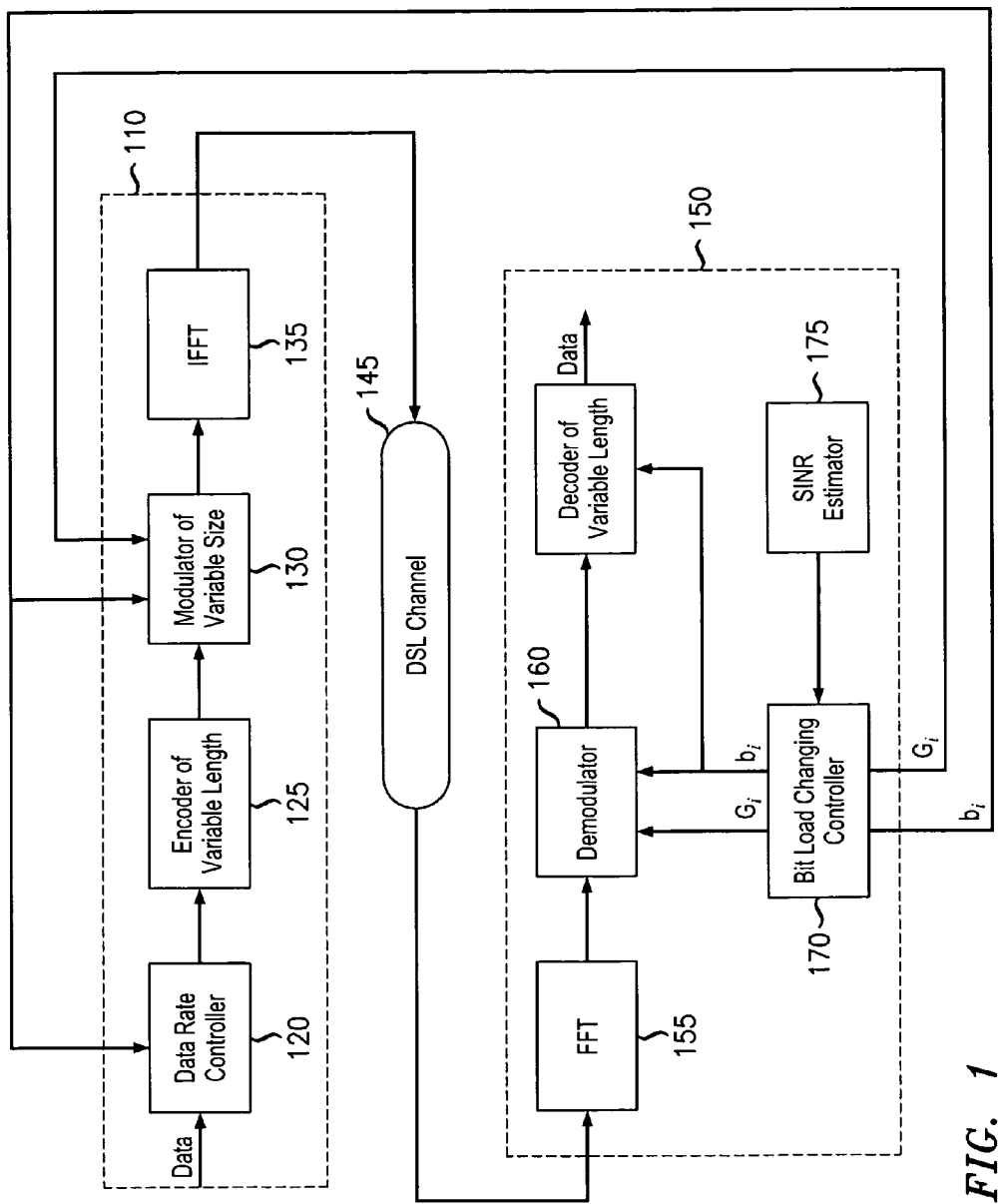
FIGS. 1-4 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are executed by a processor and may be encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

The term "channel" may be understood as any combination of frequency band allocation, time allocation and code allocation.

Various implementations of DSL communications technology, including VDSL2 technology, are well known. The use of VDSL2 is standardized in ITU G.993.2, February, 2006, the entire contents of which are incorporated by reference.

Therefore, for the sake of brevity, example embodiments are described with reference to those aspects of DSL which aid in describing example embodiments. While example embodiments are discussed with reference to DSL systems, it should be understood that example embodiments should not be limited to DSL and may be implemented in other communication systems. For example, example embodiments may be implemented in Ethernet for the first mile, home data networks (e.g., WiFi) and car communications.

Conventional DSL System

FIG. 1 illustrates an example embodiment of a VDSL2 system.

As shown, a system 100 includes a provider 110 and a customer premises equipment (CPE) 150. The provider 110 provides data requested by the CPE 150 over a channel 145.

In the system 100, bit swapping or SRA may be employed. In bit swapping, bit loading values are exchanged between tones, thereby yielding the same total throughput. With SRA bit loadings, values are wholly re-assessed from new SINR measurements and re-sent to transmitter for transmitter-receiver coordination. Bit swapping and SRA may be referred to as bit load changing operations.

As should be understood, the channel 145 may be divided into a plurality of narrow frequency bands, also known as tones.

The provider 110 includes a data rate controller 120, an encoder 125, a modulator 130 and inverse fast Fourier transform (IFFT) 135. It should be understood that the data rate controller 120, encoder 125, modulator 130 and inverse fast Fourier transform (IFFT) 135 may be implemented as hardware, software or firmware. In the case of any of the data rate controller 120, encoder 125, modulator 130 and inverse fast Fourier transform (IFFT) 135 being software, it should be understood that a data processor, such as a digital signal processor or a microcontroller, is specifically programmed to execute the software.

Data is passed from the rest of an operator's network to the provider 110, e.g., TV channels, Internet, and commands for home security systems. In the case of a user (user of the CPE 150), data originates at home and is sent by equipment to the CPE 150.

The data rate controller 120 determines a code length, e.g., a number of symbols used in the code, based on the allocated number of bits for each tone and/or Seamless Rate Adaption (SRA). SRA is known and standardized within VDSL2. Therefore, for the sake of brevity, SRA will not be described.

As is known, the encoder 125 maps information bits into coded bits of an error correcting code. The encoder 125 implements codes of various lengths.

The modulator 130 uses a variable size constellation. More specifically, conventional DSL systems, such as the system 100, use bit loading. In FIG. 1, the modulator 130 uses distinct constellations of symbols on each tone, with varying numbers of points. For example, a bit loading of 6 bits is implemented as $2^6$ Quadrature Amplitude Modulation (or equivalent). The number of bits (constellation size) assigned to a particular tone is done according to the measured SINR and the number of bits assigned to the particular tone is stored in the Bit Allocation table. During operation, the number of bits assigned to some tones may be increased, while at the same time, the number of bits on other tones is decreased. Concurrently, adjustments are made to the power assigned to each tone through fine power adjustments ($G_i$) and other mechanisms.

Therefore, for each tone i, the modulator 130 adjusts the constellation size based on an allocated number of bits $b_i$ for the tone i. A fine power adjustment $G_i$ impacts the SINR of the tone i and therefore, affects a probability of demodulation error (at a slicer 160).

The IFFT 135 receives the constellation signals from the modulator 130 and transforms the constellation signals into time domain signals that are transmitted over the DSL channel 145 (e.g., at least one copper line) to the CPE 150. The output of the IFFT 135 is a real value (vector).

The CPE 150 may be a modem or any other communication device configured to communicate with the provider 110. The CPE 150 may be generally referred to as a user.

The CPE 150 includes an FFT 155, the slicer 160, a decoder 165, a bit load changing controller 170 and a signal to interference plus noise ratio (SINR) estimator 175. It should be understood that the FFT 155, the slicer 160 and the decoder 165 may be implemented as hardware on a single chip or as firmware. The bit load changing controller 170 and the SINR estimator 175 may be implemented as hardware, software or firmware. In the case of any of the bit load changing controller 170 and the SINR estimator 175 being software, it should be understood that a data processor, such as a digital signal processor or a microcontroller, is specifically programmed to execute the software.

The SINR estimator 175 estimates the SINR for each tone transmitted over the DSL channel 145 and provides the estimated SINRs to the bit load changing controller 170. The SINR estimator 175 estimates the SINRs using any known method.

The bit load changing controller 170 receives the estimated SINRs from the SINR estimator 175. Based on the estimated SINRs and a noise margin per tone, the bit load changing controller 170 allocates bits among the plurality of tones.

As shown in FIG. 1, the bit load changing controller 170 generates a number of allocated bits $b_i$ for a tone i and an associated fine power adjustment $G_i$ based on the estimated SINRs and the noise margin.

Bit loading is determined via measured SINR, at the time when transmission is being started. The noise margin is a factor subtracted from the total SINR. This is done to protect the line from decreases in the SINR which result from additional lines turning on (among other factors). Thus, the SINR remains sufficiently high over the tones so that accurate (low error) demodulation and correct (low error) decoding will ensue. Noise margin holds resources in reserve against adverse fluctuations. The choice of size of the noise margin is usually made by an operator (e.g., provider 110) and reflects a balance of higher data rates versus more frequent line dropping and other forms of degradation (e.g. glitching on audio/visual signals).

For example, in VDSL2, the noise margin per tone may be 6 dB. For those tones with a SINR less than 6 dB, the bit load changing controller 170 reduces the number of bits allocated to that tone. For tones with a SINR greater than 6 dB, the bit load changing controller 170 may increase the amount of bits allocated to that tone.

For each tone, the bit load changing controller 170 provides the number of allocated bits $b_i$ and the associated fine power adjustment $G_i$ to the slicer 160 and the modulator 130. Moreover, the bit load changing controller 170 provides the number of allocated bits $b_i$ to the data rate controller 120. Communications between the bit load changing controller 175 and the provider 110 are through a feedback channel.

The FFT 155 receives the plurality of tones over the DSL channel 145. As is known, the FFT 155 transforms the received tones in the time domain to frequency domain.

The slicer 160 receives the signal in the frequency domain and demodulates the signal into bits. As is known, the slicer 160 is a hard decision demodulator.

The slicer 160 demodulates each tone based on a number bits $b_i$ allocated to the tone i and a fine power adjustment $G_i$ for the tone i. The slicer 160 identifies the nearest point in the constellation signal set to the signal received. This gives a hard decision for the number of bits in each tone which is sent.

The decoder 165 is a trellis decoder. More specifically, the decoder 165 uses trellis-coded modulation for error correction. The decoder 165 decodes the output of the slicer 160 to generate received data.

However, in FIG. 1, the use of the SINR margin affects the performance of the system 100. For example, a high SINR margin may slow the throughput of the network while a low SINR may increase the risk of errors and a particular DSL line dropping.

Moreover, many control mechanisms are used, such as bit load changing and fine power adjustments. In the decoder 165, trellis-coded modulation allows data transmission at rates that are not close to theoretical limits (Shannon Capacity). The slicer 160 does not permit the data transmission rate to be close to the Shannon Capacity.

Figure 2:
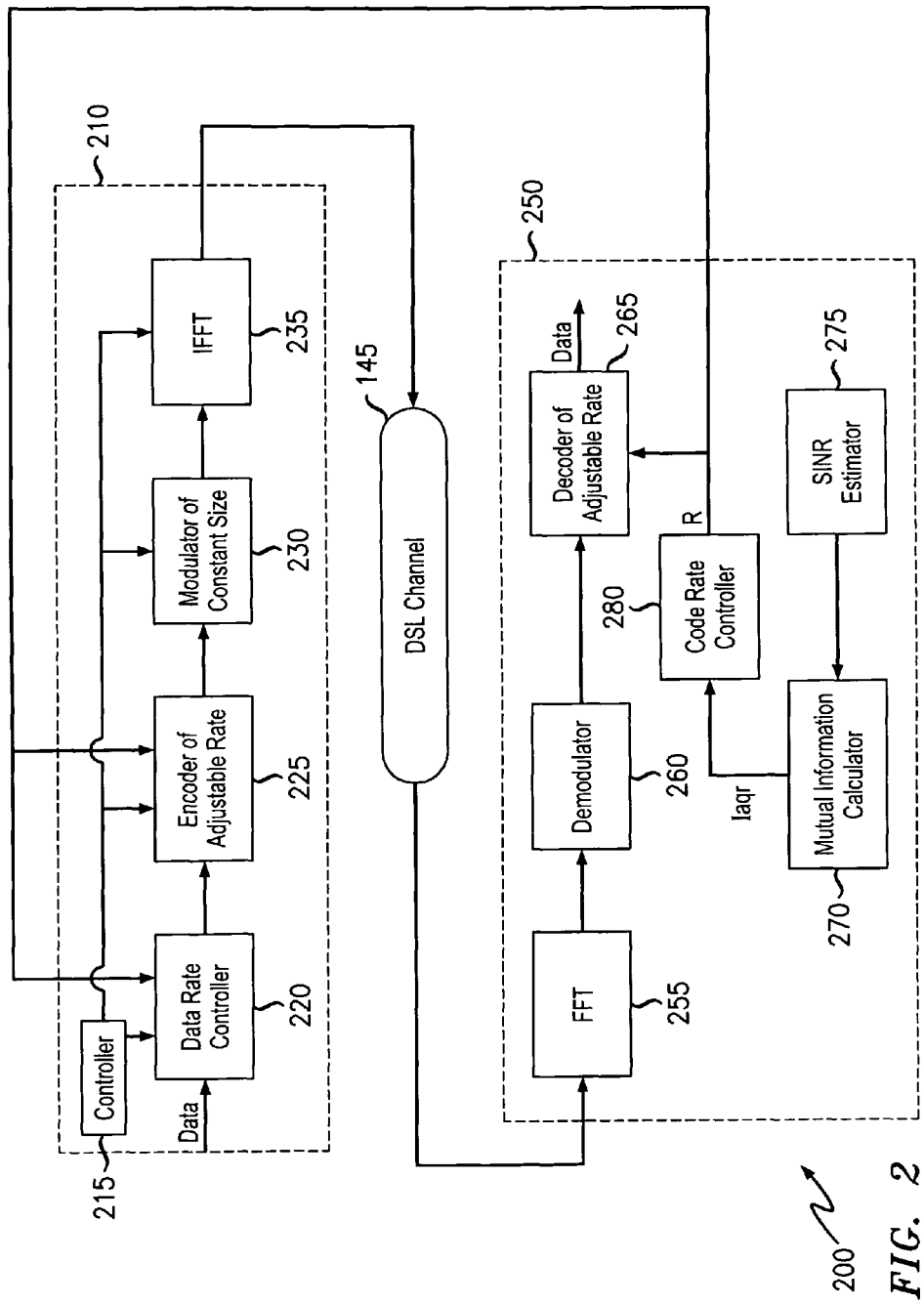

FIG. 2 illustrates an example embodiment of a DSL system. A system 200, shown in FIG. 2, uses a constant number of bits for each tone.

In the description of the example embodiment shown in FIG. 2, "tone" is a DMT tone. However, it should be understood that the example embodiment shown in FIG. 2 is not limited to the use of DMT tones.

As shown, the system 200 includes a provider 210 and a customer premises equipment (CPE) 250.

The provider 210 determines the number of bits in each tone by at least one of a maximum number of bits per tone permitted by the type of system and a largest possible SINR for the tone.

The maximum number of bits per tone permitted by the type of system may be defined in a standard for the type of system. Consequently, the maximum number of bits for each tone is fixed. In another embodiment, the maximum number of bits permitted by the network for each tone may be set by a builder/ operator of the network (e.g., in a proprietary communication network, a builder of a car utilizing car communications).

The largest possible SINR is achieved when there is no interference and only thermal noise is present.

For example, on each tone m, an SINR estimator 275 may determine a magnitude of a direct line loss $d_m$ in dB. Parameter $P_m$ is a maximum transmit power spectrum in (dB/Hz) for the tone m and N is a noise spectrum in dB/Hz. Thus, the SINR estimator 275 determines the largest possible SINR in dB as:

$$\gamma_m = P_m - d_m - N \quad (1)$$

The largest possible SINR $\gamma_m$, is measured once, during the initial implementation of the system 200. In another example embodiment, the determination of the largest possible SINR $\gamma_m$, may be preprogrammed. In the case of the largest possible SINR $\gamma_m$, being preprogrammed, the largest possible SINR $\gamma_m$, may be determined based on a length of the line, the gauge of the line, the frequency and other additional parameters, using known models of line loss. Moreover, the largest possible SINR $\gamma_m$, may be preprogrammed into the controller 215 and communicated from the provider 210 to the CPE 250. In another example embodiment, the determination of the largest possible SINR $\gamma_m$, may be determined based on pilot signals sent from the provider 210 to the CPE 250 at initialization of the system 200.

If the number of bits for a tone based on the largest possible SINR $\gamma_m$, exceeds the maximum number of bits per tone permitted by the system 200, then the provider 210 determines that the constant number of bits is the maximum number of bits permitted by the system 200.

The largest possible SINR $\gamma_m$, for each tone may be determined upon installation of the system 200.

After the constant number of bits is determined for each tone, each constant number of bits remains fixed. More specifically, each constant number of bits remains constant, even if the current SINR in the corresponding tone is different from the largest possible SINR $\gamma_m$.

For example, if the constant number of bits for a tone is the maximum number of bits permitted by VDSL2, the constant number of bits for the tone is 15.

The system 200 maintains the constant number of bits for each tone by receiving a single parameter, a code rate R from the CPE 250. Therefore, the system 200 maintains a constant number of bits for each tone instead of adjusting a number of bits for each tone and power for each tone.

It should also be understood that various technologies provide a different maximum numbers of bits for different sets of tones. Therefore, a first set of tones may be allocated a first constant number of bits and a second set of tones may be allocated a second constant number of bits.

Consequently, the system 200 uses a constant constellation size for each tone, as opposed to a variable sized constellation. In VDSL2, if each tone is allocated the maximum number of bits, $2^{15}$ QAM modulation is used by the system regardless of the SINR values of the tones. By maintaining a constant number of bits for each tone and determining the constant number of bits based on at least one of the maximum number of bits per tone permitted by the type of system and a largest possible SINR $\gamma_m$, for the tone, the system 200 provides a larger possible data transmission rate.

Moreover, the system 200 implements a single parameter feedback, the code rate R, from the CPE 250 to the provider 210. Thus, the number of bits allocated to each tone may be maintained at a constant and the number of information bits transmitted in one DMT is not constant and is set close to the Shannon capacity.

According to some example embodiments, a controller 215 determines the constant number of bits for each tone in accordance with the discussion below and in other example embodiments an operator of the provider 210 may determine the constant number of bits for each tone.

The provider 210 provides data requested by the CPE 250 over the channel 145. The provider 210 includes the controller 215, a data rate controller 220, an encoder 225, a modulator 230 and inverse fast Fourier transform (IFFT) 235. It should be understood that the data rate controller 220, encoder 225, modulator 230 and inverse fast Fourier transform (IFFT) 235 may be implemented as hardware, software or firmware. In the case of any of the data rate controller 220, encoder 225, modulator 230 and inverse fast Fourier transform (IFFT) 235 is software, it should be understood that a data processor, such as a digital signal processor or a microcontroller (e.g., the controller 215), is specifically programmed to execute the software.

In an example embodiment, the controller 215 provides the encoder 225 and the modulator 230 with the constant number of bits allocated to each tone.

The data rate controller 220 determines a code length, e.g., a number of symbols used in the code, based on the code rate R.

The encoder 225 is an adjustable rate encoder. For example, the encoder 225 may be a low-density-parity-check (LDPC) or turbo code encoder having an adjustable code rate. Rate adjustable LDPC codes may also be referred to as rate compatible LDPC codes. It should be understood that other efficient rate compatible codes may be used by the encoder 225 instead of LDPC or turbo codes.

The encoder 225 encodes the output from the data rate controller 220 into codes at the code rate R. More specifically, the encoder 225 encodes the data from the data rate controller 220 as information bits in a codeword.

The code rate R is a ratio of information bits over a total number of bits in a codeword. The code rate R is obtained using the aggregate mutual information across all tones in the system 200.

As is known, "mutual information" is a measure of the information which can be carried across a channel. For real channels, mutual information may be defined in accordance with equation (10.20) in Thomas M. Cover and Joy A. Thomas, *Elements of Information Theory* (1st Edition) as:

$$C = \frac{1}{2}\log\left(1 + \frac{P}{N}\right) \quad (2)$$

where P is a transmit power and N is the noise.

In the system 200, the channel 145 is over a complex field. Therefore, mutual information I in bits for each tone m may be defined as:

$$I_m = \log_2(1 + SINR) \quad (3)$$

Equation (3) is known as the Shannon formula for mutual information across an additive Gaussian complex channel.

The determination of the code rate R and the aggregate mutual information are described in greater detail below with reference to the CPE 250. The encoder 225 determines the number of information bits in each codeword by multiplying the received code rate R by the number of total bits in the codeword.

For each DMT symbol, the length of a codeword to be transmitted over the tone is the number of bits associated with the symbol. However, it should be understood that alternate coding schemes involving multiple symbols and/or codewords across two or more symbols may be implemented.

The modulator 230 uses a constant size constellation for each tone. More specifically, for each tone m, the modulator 230 maintains a constant constellation size associated with the tone m.

The constellation size is based on the largest possible SINR $\gamma_m$ for that tone and/or the maximum number of bits permitted by the system 200. The tones may all have the same number of bits (e.g., maximum number of bits permitted by the network), different number of bits or a combination thereof. As described above, the constant number of bits for each tone remains constant once they are set based on the largest possible SINR for that tone and/or the maximum number of bits permitted by the system 200. Thus, the constant size constellation for each tone m may be $2^{b_m}$, where $b_m$ is the constant number bits for the tone m.

The constellation size for the tone m becomes constant once it is determined based on the largest possible SINR $\gamma_m$, for that tone and/or the maximum number of bits permitted by the system 200.

The IFFT 235 receives the constellation signals from the modulator 230 and transforms the constellation signals into time domain signals that are transmitted over the DSL channel 145 to the CPE 250.

The CPE 250 may be a modem or any other communication device configured to communicate with the provider 210. The CPE 250 may be generally referred to as a user.

The CPE 250 includes an FFT 255, a demodulator 260, a decoder 265, a mutual information calculator 270, the signal to interference plus noise ratio (SINR) estimator 275 and a code rate controller 280. It should be understood that the FFT 255, the demodulator 260 and the decoder 265 may be implemented as hardware on a single chip. The mutual information calculator 270 and the SINR estimator 275 may be implemented as hardware, software or firmware. In the case of any of the mutual information calculator 270 and the SINR estimator 275 being software, it should be understood that a data processor, such as a digital signal processor or a microcontroller, is specifically programmed to execute the software.

The FFT 255 receives the plurality of tones over the DSL channel 145. As is known, the FFT 255 transforms the received tones in the time domain to frequency domain.

The demodulator 260 may be a soft or hard decision demodulator. The demodulator 260 receives the signal in the frequency domain from the FFT 255 and demodulates the signal into log likelihood ratios (LLR) (soft bits), in the case of a soft demodulator. For example, the demodulator 260 may implement sphere demodulation or demodulation based on the Gibbs sampling method. Gibbs sampling is described in R. R. Chen et al., *Approaching MIMO Capacity Using Bitwise Markov Chain Monte Carlo Detection*, IEEE Trans. on Communications, vol. 58, pp. 423-428, 2010, the entire contents of which are incorporated by reference. It should be understood that any other equivalent method may also be used to estimate the LLRs.

The demodulator 260 demodulates each tone into the allocated constant number of bits, as the LLR of the bits, and provides the LLR of the bits to the decoder 265.

The SINR estimator 275 estimates the SINR for each tone transmitted over the DSL channel 145 and provides the estimated SINRs to the mutual information calculator 270. The SINR estimator 275 estimates the SINRs using any known method.

The mutual information calculator 270 determines mutual information in each tone using equation (3) and based on the corresponding SINRs provided by the SINR estimator 275. The mutual information calculator 270 then determines an aggregate mutual information $I_{agr}$ of the DSL channel 145 across the tones based on the mutual information $I_m$ in each tone.

In more detail, the mutual information calculator 270 determines, the aggregate mutual information $I_{agr}$ as follows:

$$I_{agr} = (I_1 + \ldots + b_M)/(b_1 + \ldots + b_M) \quad (4)$$

where $I_m$ is the mutual information on tone m, M is the number of DMT tones, and $b_m$ is the number of bits in tone m.

The mutual information calculator provides the aggregate mutual information $I_{agr}$ to the code rate controller 280. Based on the aggregate mutual information $I_{agr}$, the code rate controller 280 determines the code rate R.

More specifically, according to the fundamentals of information theory, the code rate R is less than or equal to the aggregate mutual information, so, $$R \leq I_{agr} \quad (5)$$

The code rate controller 280 sets a maximum possible code rate to equal the aggregate mutual information $I_{agr}$.

The code rate controller 280 determines an aggregate mutual information margin $I_{mar}$ based as follows:

$$I_{mar} = I_{agr} - \text{margin} \quad (6)$$

The margin is determined by an operator of the provider 210 and is based on empirical data. The margin reflects a balance between efficiency and reliability.

The code rate controller 280 sets the code rate R to be equal to the aggregate mutual information margin $I_{mar}$ as defined in equation (6). Moreover, by basing the code rate R on the aggregate mutual information $I_{agr}$ (across all tones) instead of a per tone basis, an amount of change of the code rate R is reduced.

The rate at which the code rate controller 280 determines the code rate R is based on the implementation of the system 200. In one example embodiment, in a fully vectored system, the code rate controller 280 may determine the code rate R once. In a scheduled system, with various lines being in "on/off" states, the code rate controller 280 may determine the code rate R periodically or when a certain situation is detected (e.g., a line departs (communications cease) or a line joins (communications start)).

The code rate controller 280 provides the code rate R to the decoder 265. The code rate controller 280 also provides the code rate R to the encoder 225 and the data rate controller 220 through a feedback channel. The feedback channel is set up using known methods.

The decoder 265 is an adjustable rate LDPC decoder, Turbo decoder or any other rate compatible decoder. The decoder 265 decodes the output of the demodulator 260 based on the code rate R to generate received data.

Thus, the system 200 transmits data using a constant number of bits for each tone and is configured to control transmission of data from the provider 210 to the CPE 250 based on a single parameter, the code rate R, as opposed to changing the number of bits allocated to each tone and changing the power allocated to each tone.

It should be understood that the system 200 may include additional elements and should not be limited to the features shown in FIG. 2. The features shown in FIG. 2 are provided for understanding the system 200 and are not necessarily the only features in the system 200.

Additionally, in an example embodiment, the CPE 250 is configured to determine if the SINRs of a line decreases based on the corresponding SINRs from the SINR estimator 275 and/or if the decoder 265 fails. If the CPE 250 determines that the SINRs have decreased, the CPE 250 signals to the provider 210 that retransmission may fail. The provider 210 may then determine to lower the code rate so the CPE 250 may successfully receive data. Once the CPE 250 successfully receives data with the lowered code rate, the CPE 250 determines the code rate R based on the SINRs associated with the successfully received data.

In one example embodiment, the CPE 250 determines the SINRs by using a difference between received signals and expected received signals, respectively, given the codeword is correct and the decoding is successful. The CPE 250 may also determine SINRs based on pilot signals transmitted from the provider 210 to the CPE 250. It should be understood that other methods of determining SINR may be implemented.

In another example embodiment, the system 200 may be implemented without crosstalk cancellation over short length lines (e.g., lines less than 200 m). As an alternative to crosstalk cancellation, the system 200 may implement scheduling which includes changing line activity on and off. Changes in schedule will typically involve changes in SINR over all tones. The system 200 may determine the SINR and, thus, the average mutual information for each DMT symbol in advance and the code rate R. Therefore, the CPE 250 may decode received signals based only on code rate changes according to the schedule. Consequently, the system 200 reduces complexity and the potential inefficiencies which may otherwise ensue.

Figure 3:
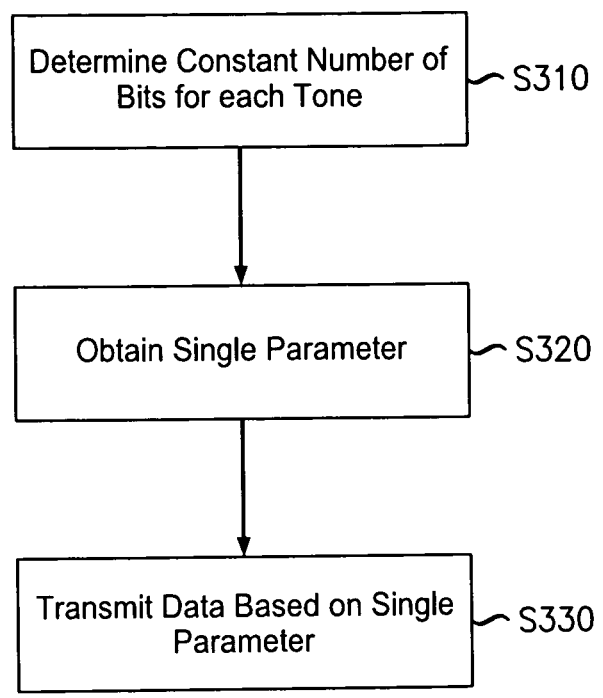

FIG. 3 illustrates a method of controlling a system according to an example embodiment. The system 200, including the provider 210, is configured to implement the method of FIG. 3. However, it should be understood that various systems may perform the method of FIG. 3 and the method shown in FIG. 3 should not be limited to the provider 210.

In the method of FIG. 3, the provider communicates with a CPE over a channel, such as a DSL channel.

At S310, the provider determines a constant number of bits for each of a plurality of tones in the system. The provider determines the constant number of bits in each tone by at least one of a maximum number of bits per tone permitted by the type of system and a largest possible SINR for the tone. If the number of bits for a tone based on the largest possible SINR exceeds the maximum number permitted by the system then the constant number of bits is the maximum number of bits permitted by the system.

At S320, the provider obtains a single parameter from the CPE over a feedback channel. The single parameter is a code rate, such as the code rate R described with reference to FIG. 2.

At S330, the provider transmits data as information bits to the CPE based on the single parameter. The provider maintains the constant number of bits for each tone during transmissions. More specifically, each constant number of bits remains constant, even if the current SINR in the corresponding tone is different from the largest possible SINR. Therefore, the system maintains a constant number of bits for each tone instead of adjusting a number of bits for each tone and power in each tone.

Additionally, the provider may encode the data into information bits based on the code rate. The encoding may be performed in the same manner as described in FIG. 2. Thus, for the sake of brevity, the encoding will not be described in further detail.

Figure 4:
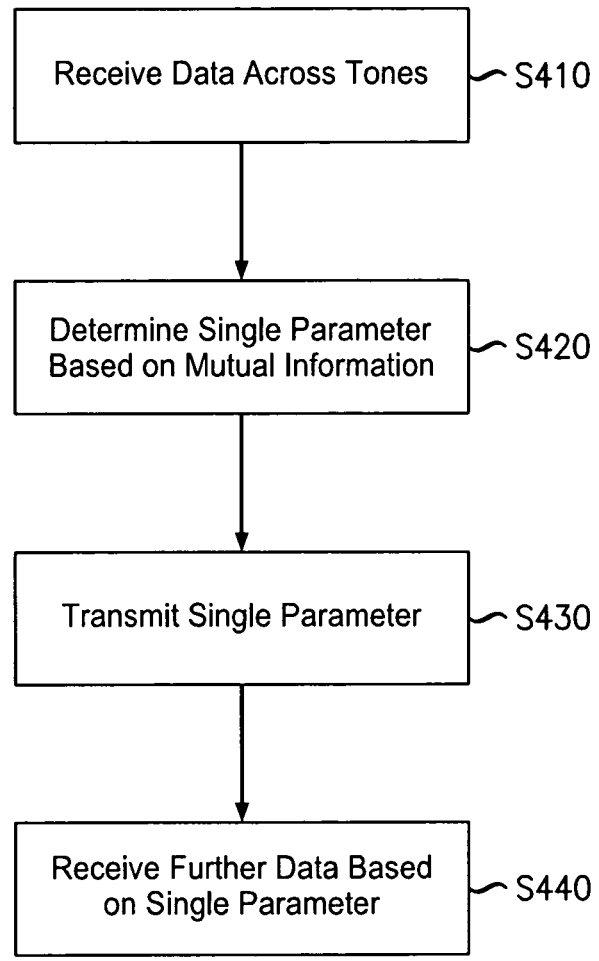

FIG. 4 illustrates a method of receiving data over a system. The system 200, including the CPE 250, is configured to implement the method of FIG. 4. However, it should be understood that various systems may perform the method of FIG. 4 and the method shown in FIG. 4 should not be limited to the CPE 250.

In the method of FIG. 4, a provider communicates with the CPE over a channel, such as a DSL channel.

At S410, the CPE receives data across a plurality of tones in the system. Based on the received data, the CPE determines the SINR for each tone, mutual information for each tone, and an aggregate mutual information for all tones. Based on the mutual information for all tones, the CPE determines a single parameter at S420. The single parameter is a code rate, such as the code rate R.

The CPE transmits the single parameter to the provider at S430. The provider adjusts the data rate control and encoding based on the code rate and transmits further data to the CPE at S440. The number of bits received in each tone remains constant. Thus, the number of bits in each tone is independent of associated SINRs of the tone. The number of bits in each associated tone may be a maximum number of bits permitted by the network. The number of bits in each tone may be the same.

As described above, a constant number of bits is allocated to each tone. The number of bits in each tone is based on at least one of the largest possible SINR for the tone or a maximum number of bits permitted by the system. Consequently, the number of bits in each tone is not based on a continuously monitored SINR for the tone.

By maintaining a constant number of bits for each tone and determining the constant number of bits based on maximum number of bits per tone permitted by the type of system and a largest possible SINR for the tone, the system 200 provides a larger possible data transmission rate.

Moreover, example embodiments disclose a single parameter feedback, a code rate, from the CPE to the provider. Thus, the number of bits allocated to each tone may be maintained at a constant and the number of information bits transmitted in one tone symbol is close to the Shannon capacity. Moreover, the use of a single parameter simplifies the control of a system.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling a system, the method comprising:
    determining, by a first system element, a constant number of bits for each of a plurality of tones, each constant number of bits being constant, the plurality of tones for communication between the first element and a second element of the system;
    obtaining, by the first system element, a single parameter from the second system element, the single parameter being a single code rate value for encoding data, the single code rate value being based on a measure of mutual information across the plurality of tones performed at the second system element; and
    transmitting, by the first system element, the data as information bits in the plurality of tones across a channel based on the single parameter, each of the plurality of tones including the constant number of bits.

2. The method of claim 1, wherein the determining a constant number of bits includes,
    determining an associated maximum signal to interference plus noise ratio (SINR) for each tone before the transmitting, and
    determining the constant number of bits for each tone based on the associated maximum SINR, the constant number of bits for each tone being constant subsequent to the transmitting.

3. The method of claim 2, wherein the determining the constant number of bits for each tone based on the associated maximum SINR includes,
    determining a maximum number of bits permitted by the system, and
    selecting the maximum number of bits permitted by the system as the constant number of bits, if the constant number of bits based on the associated maximum SINR exceeds the maximum number of bits permitted by the system.

4. The method of claim 1, wherein the transmitting includes,
    determining a scheduled transmission for symbols across each tone, and
    determining an associated actual signal to interference plus noise ratio (SINR) for each tone based on the scheduled transmission.

5. The method of claim 1, wherein the constant number of bits is a maximum number of bits permitted by the system for the tone.

6. The method of claim 1, further comprising:
    encoding the data into the information bits based on the single code rate value.

7. The method of claim 6, wherein the code rate is a ratio of the information bits over a number of bits in a codeword.

8. A method of receiving data over a system, the method comprising:
    receiving, from a system element, data across a plurality of tones, each of the plurality of tones being allocated a constant number of bits in the data;
    determining a single parameter based on mutual information across the plurality of tones, the single parameter being a single code rate value for encoding further data;
    transmitting, to the system element, the single parameter; and
    receiving the further data as information bits in the plurality of tones at a rate based on the single parameter, each of the plurality of tones including the allocated constant number of bits.

9. The method of claim 8, further comprising:
    decoding the further data based on the single parameter.

10. The method of claim 8, wherein the determining a single parameter includes,
    determining the mutual information across each of the plurality of tones, and
    determining a sum of the mutual information over the plurality of tones and a sum of a number of bits across the plurality of tones, the single code rate value being based on the sum of the mutual information and the sum of the number of bits across all tones.

11. The method of claim 10, wherein the number of bits in each tone is independent of an associated signal to interference plus noise ratios (SINRs) of the tone during the receiving further data.

12. The method of claim 8, wherein a number of bits in each tone is the same.

13. The method of claim 8, wherein a number of bits in each associated tone is a maximum number of bits permitted by the system for the associated tone.

14. The method of claim 8, wherein the number of bits in each tone is constant.

15. A provider in a system, the provider comprising:
    an adjustable rate encoder configured to receive data and a single parameter, the single parameter being a single code rate value, the adjustable rate encoder being further configured to encode the data into encoded bits based on the single code rate value, the single code rate value being based on a measure of mutual information across the plurality of tones performed at a system element;
    a modulator configured to modulate the encoded bits across a plurality of tones, the number of encoded bits in each tone being a constant number of bits; and
    a transmitter configured to transmit the plurality of tones across a channel.

16. The provider of claim 15, wherein the modulator is configured to modulate the encoded bits using a constellation for each tone, a size of the constellation for each tone being constant.

17. The provider of claim 15, wherein the constant number of bits in each associated tone is based on a maximum signal to interference plus noise ratio (SINR) for the associated tone.

18. The provider of claim 15, wherein the constant number of bits in each associated tone is a maximum number of bits permitted by the system for the associated tone.

19. A transceiver in a system, the transceiver comprising:
- a code rate controller configured to determine a single parameter based on mutual information across a plurality of tones between the transceiver and a remote transceiver, the single parameter being a single code rate value;
- a demodulator configured demodulate the plurality of tones from the remote transceiver into a constant number of bits allocated to each of the plurality of tones; and
- an adjustable rate decoder configured to receive the bits and the single parameter, the adjustable rate decoder being further configured to decode the bits into data based on the single parameter.

* * * * *